Sept. 30, 1969   J. ENTING   3,469,855
PACKING DEVICES FOR SEALING THE PASSAGE OF A
PISTON ROD THROUGH A WALL
Filed Jan. 26, 1967

INVENTOR
JANNES ENTING
BY
ATTORNEY

United States Patent Office 3,469,855
Patented Sept. 30, 1969

3,469,855
PACKING DEVICES FOR SEALING THE PASSAGE OF A PISTON ROD THROUGH A WALL
Jannes Enting, Amsterdam, Netherlands, assignor to Werkspoor N.V., Amsterdam, Netherlands, a company of the Netherlands
Filed Jan. 26, 1967, Ser. No. 611,877
Claims priority, application Netherlands, Jan. 31, 1966, 6601181
Int. Cl. F16j 15/18, 15/56
U.S. Cl. 277—235                                6 Claims

ABSTRACT OF THE DISCLOSURE

A seal for a reciprocating rod passing through a wall or partition separating chambers subjected to different pressures and which contain fluids which are to be confined within their respective chambers, the seal being in the form of a tubular body of resilient material having an annular intermediate bore portion of uniform diameter adapted to seal against the rod with a predetermined sealing pressure, and tapered bore portion at the opposite ends of the body which clear the rod. Spring washers are embedded in the body and anchored at their peripheries to prevent such axial compression of the body as would cause undue radial sealing pressure to be exerted against the rod.

---

Figure 1:
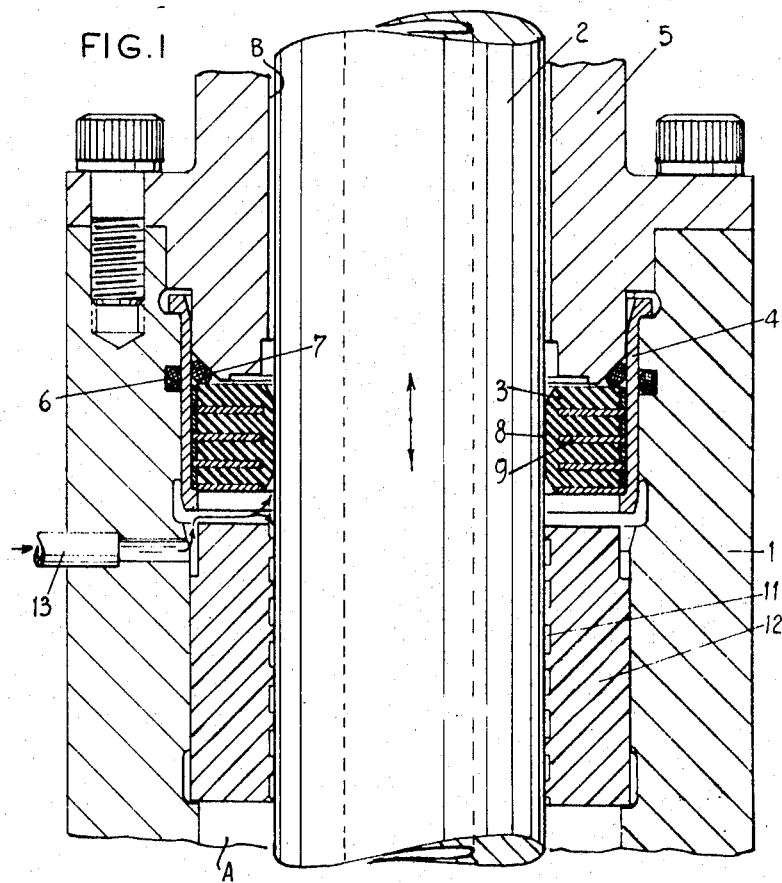

The invention relates to a packing device for effecting a seal around the piston rod of a reciprocating machine, particularly the piston rod and/or the displacement rod of a cold gas refrigerator, where it passes through an end wall of a cylinder or gas chamber of said machine, said packing device being in the form of an annular body of rubber or other resilient material which snugly fits said rod.

A difficulty arises in such refrigerators in connection with effecting a seal around the piston rod and the displacement rod which pass through the partition between the driving gear box and the gas chamber. The gas pressure in the gas chamber is high whereas the pressure in the gear box is about that of atmospheric air. Since the driving gear is cooled and lubricated by means of oil, it is essential that a seal be provided around the rods to prevent contamination of the gas by such oil and it is also essential that the washing gas, e.g. hydrogen, be prevented from escaping into the gear box.

It is conventional to provide a stack of resilient scraping rings around the rods which are so compressed by a packing sleeve as to guarantee a pressure between the piston rod and said rings which is sufficiently high as to obtain the required seal. This packing device has the disadvantage that the lubrication in the region between the seal and the rods is unsatisfactory so that a great deal of heat is produced in said region. For this reason, the working life of such a packing device is short and leakage of gas and oil along said rods soon occurs.

The use of resilient O-rings around the piston rod and the displacement rod which are carried in grooved sleeves has also been employed. These O-rings are pressed against the relevant rod by the gas pressure and a very thin oil film is produced between said ring and the relevant rod which, although it results in the generation of less heat and greater working life than the aforementioned rings, nevertheless does not obviate the necessity for frequent replacement of the O-rings if leakage of gas and oil along the rods is to be prevented.

The present invention is directed to an improved seal which will avoid the disadvantages of the packing devices used up to now. It involves the use of a generally cylindrical resilient body in which spring washers are embedded, the washers extending radially or substantially radially from a region near the bore presented by the body to a region beyond the outer surface of said body, and the resilient body is enclosed by rings interposed between those portions of the washers projecting from said body. These spring washers define together with the properties of the sealing body of the packing device, control the sealing pressure axially along the rod and make it possible to bring this sealing pressure into agreement with the conditions for a permanent seal, a satisfactory lubrication and a small heat production in said area.

The shape of the inner surface of the annular resilient body also affects the sealing pressure and the behaviour of the lubricating oil film in the sealing area between the packing device and the piston rod and/or the displacement rod. It is advantageous to reduce the cross sectioning central bore of the resilient body, for instance conically from both end faces of said body towards a region between said end faces. A further improvement is obtained by confining the taper which faces the gas chamber to an axial extent greater than the axial extent of the taper at the opposite end of the body which faces away from the gas chamber. Furthermore the apex angle of each of the conical or substantially conical tapers appears to influence the equality of the seal. In many cases the apex angle of the conical or substantially conical taper facing the gas chamber should be more acute than the apex angle of the conical or substantially conical taper which faces away from the gas chamber.

When the material and the dimensions of the resilient body, the shape of the bore of said body and the number and the arrangement of the embedded spring washers are selected an oil film being formed between the resilient body and said rod, of which the thicknesses for both directions of movement of said rod guarantee a sufficient lubrication and are such as to make the net oil transport through the packing device nil while at the same time effecting sufficient sealing pressure axially along the end such as to produce a gas tight seal.

Figure 2:
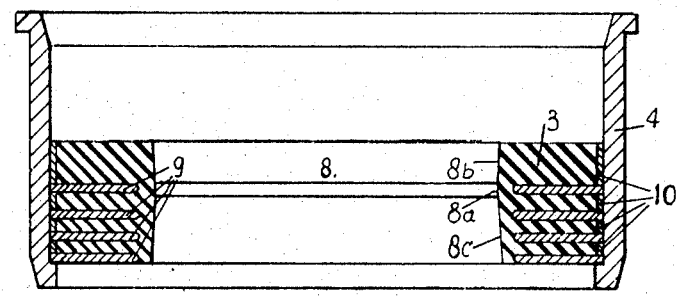

The invention will be elucidated with the aid of the accompanying drawing; wherein is:

FIG. 1 is a sectional view of the packing device for the piston rod and showing the partition between the gear box and the gas chamber of a cold gas refrigerator, and FIG. 2 is an enlarged sectional view of the sealing member used in said packing device when it is unassembled.

Referring to FIG. 1, a portion of the partition 1 between the driving gear box (not shown), which is below said partition, and the gas chamber (not shown), which is above said partition and is filled with hydrogen, of a cold-gas refrigerator. The pressure in the gear box is about that of atmospheric air and the pressure in the gas chamber is high, the spaces A and B in FIG. 1 forming portions of the gear box chamber and the gas chamber respectively. A piston rod 2 passes through the partition 1 from the gear box chamber space A to the gas chamber space B and is adapted to reciprocate up and down. To establish a gas and liquid tight seal around the piston rod 2 when it passes through the partition 1, a sealing ring 3 of rubber snugly fits around the piston rod and is enclosed in a sleeve 4 which is held in place by and sealed with the partition by means of a sleeve 5 and O-rings 6, 7.

It will appear from FIG. 2 that the resilient sealing ring 3 forms a portion of a packing device and is provided with embedded spring washers 9 which radially or substantially radially extend from a region near the central cavity or bore 8 to a region beyond the outer surface of said ring 3. Spacing rings 10 snugly surround the resilient sealing ring 3 and the spring washers 9 lie with their portions projecting from the sealing ring between and against said spacing rings. In unassembled condition the central cavity or bore 8 has a surface which tapers conically from both end faces of the sealing ring 3 to a narrow zone 8a between said end faces. The conical taper 8b which extends from the upper side of the seal facing the gas chamber is of lesser axial extent than the conical taper 8c extending from the lower side of said seal and the apex angle of the upper conical taper 8b is more acute than that of the lower conical taper 8c. These apex angles are in the shown embodiment only a few degrees, say 3° and 3°30′.

The piston rod 2 is lubricated beneath the packing device 3, 9, 10 by oil, which is supplied through a conduit 13 and is returned to the gear box by a helical groove 11 provided in a sleeve 12. The oil film which stays behind on the piston rod is moved together with the rod 2 and is thereby forced into the sealing area between the resilient ring 3 and said rod. However, owing to the special construction of the packing device just as much oil as is moved upwards during the upward stroke of the piston rod is moved downwards during the downward stroke of said rod. The result thereof is that the piston rod is well lubricated in the sealing area and that transfer of oil to the gas chamber above the partition 1 is avoided. Moreover, the sealing pressure axially along the rod is such as to guarantee a completely gas-tight seal, so that gas from the gas chamber cannot escape towards the gear box.

What I claim is:

1. A composite packing ring for the fluid-tight passage of a reciprocating piston rod through a wall, comprising a single annular body of soft resilient material adapted for a close fit on said piston rod, a plurality of axially spaced spring-washers embedded in said body and extending radially from a circle inside said body and near its central hole to a circle having a diameter which is greater than the diameter of said body and a plurality of rigid rings enclosing said annular body and keeping said spring-washers spaced apart at the outer circumference of said body.

2. A composite packing ring as claimed in claim 1, in which the inner surface of the annular body is formed for its major part by two truncated grosso modo conical surfaces converging from the end faces of said body towards a circular region inside the central hole of said body.

3. A composite packing ring as claimed in claim 2, in which the altitudes of the two truncated grosso modo conical parts of the inner surface of the annular body differ.

4. A composite packing ring as claimed in claim 2, in which the apex-angles of the two truncated grosso modo conical parts of the inner surface of the annular body differ.

5. A seal assembly adapted to be disposed within an opening in a partition separating two chambers at least one of which is subjected to fluid pressure and to sealingly engage a rod passing therethrough comprising in combination, an elongate generally tubular body of rubber-like material having opposite end faces which may be subjected to pressures thereon existing in the two chambers which tend to compress said body axially and constrict its bore, said body when relaxed having an annular intermediate portion presenting a bore of uniform diameter adapted to seal against the rod with a predetermined radial sealing pressure, said body also having annular end portions on either side of said intermediate portion whose bores clear the rod, mounting means operatively engaging with the peripheral portion of said body for preventing axial compression of said peripheral portion, and force dissipating means in at least one of said annular end portions for minimizing axial compression of said intermediate portion inwardly of its periphery so as to prevent any substantial increase in the radial pressure thereof against the rod.

6. The sealing assembly as defined in claim 5 wherein said mounting means comprises a series of annular bands of metal, said force dissipating means comprising a plurality of metallic washers interposed between adjacent pairs of said bands and extending inwardly toward but spaced from the rod.

References Cited

UNITED STATES PATENTS

| | | | |
|---|---|---|---|
| 2,485,940 | 10/1949 | Tremolada | 277—51 |
| 2,553,750 | 5/1951 | Cole | 277—235 X |
| 3,210,087 | 10/1965 | Mayer | 277—180 X |

SAMUEL ROTHBERG, Primary Examiner

U.S. Cl. X.R.

277—35